AUTOMATIC D.C. OFFSET COMPENSATION CIRCUIT
FOR AUTOMATIC EQUALIZER
Filed Jan. 24, 1968
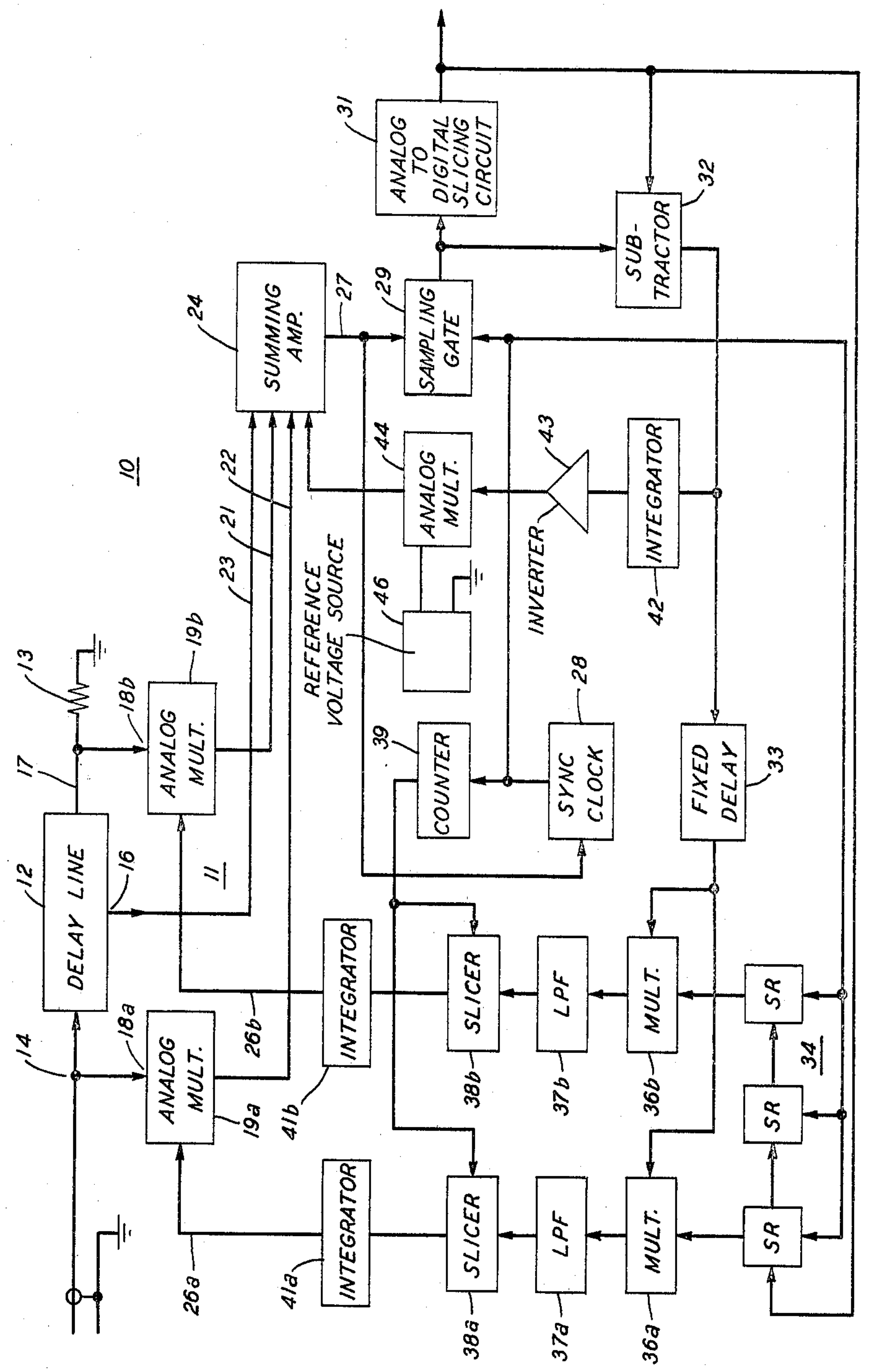
INVENTOR
C. W. FARROW
BY Richard J. Samuel
ATTORNEY United States Patent Office 3,477,043

Patented Nov. 4, 1969

3,477,043

AUTOMATIC D.C. OFFSET COMPENSATION CIRCUIT FOR AUTOMATIC EQUALIZER

Cecil W. Farrow, Monmouth Hills, N.J., assignor to Bell Telephone Laboratories, Incorporated, Murray Hill and Berkeley Heights, N.J., a corporation of New York Filed Jan. 24, 1968, Ser. No. 700,240
Int. Cl. H04b 3/04
U.S. Cl. 333—18 8 Claims

ABSTRACT OF THE DISCLOSURE

An adaptive transversal filter equalizer which includes a tapped delay line, a pair of analog multipliers and a summing amplifier in which a steady state D.C. component of a difference signal employed to derive adaptive adjusting signals is adaptively removed.

FIELD OF THE INVENTION

This invention relates to a system for equalizing a signal transmitted through a signal distorting medium and particularly to a signal equalization system in which the equalized signal is rendered symmetrical with respect to a slicing circuit.

BACKGROUND OF THE INVENTION

When a multifrequency signal which includes a series of individual data or symbol bits is transmitted through a bandwidth limited medium, different frequency components in the signal may be delayed and attenuated different amounts so that components from more than one of the individual symbol bits may coincidentally arrive at a signal receiver thereby causing intersymbol interference. One device used to equalize a received signal distorted by intersymbol interference is a transversal filter. The transversal filter is a time-domain device in which one or more equalization signals each equal to a multiple of the received signal displaced in time are added to the received signal to provide an equalized output signal.

When transmitting digital data over direct distance dialing voice channels, a new distorting transmission medium is established for each call. These voice channels should be equalized quickly compared to the time of data transmission to render equalization practical.

A system disclosed by F. K. Becker-R. W. Lucky-E. Port, in U.S. Patent No. 3,292,110, entitled "Transversal Equalizer for Digital Transmission Systems Wherein Polarity of Time-Spaced Portions of Output Signal Controls Corresponding Multiplier Setting," issued Dec. 13, 1966, automatically and systematically adjusts a transversal filter during an initial training signal transmission period. A system disclosed by R. W. Lucky in a copending application, filed June 2, 1965, Ser. No. 460,794, now Patent No. 3,368,168, entitled "Adaptive Equalizer for Digital Transmission Systems," eliminates the need for a training period by adjusting a transversal filter in response to information extracted from the received digital data signal. Another system disclosed by R. W. Lucky in a copending patent application filed Aug. 27, 1965, Ser. No. 483,129, now Patent No. 3,414,819, entitled "Digital Adaptive Equalizer System" extends the system disclosed in the R. W. Lucky application, Ser. No. 460,794, to adjust a transversal filter to compensate for intersymbol interference in a multilevel coded signal.

Each of the above-cited systems employs an analog-to-digital slicing circuit in extracting the automatic or adaptive adjusting information.

Often a received data signal to be equalized, contains a D.C. component necessitating D.C. amplifiers as elements of the transversal filter equalizer. These amplifiers are one possible cause of added D.C. offset on the signal supplied to the slicing circuit thereby preventing optimum equalization and causing an increased output error rate.

Presently, the effects of D.C. offset can be eliminated by A.C. coupling to the slicing circuit. This approach, however, can only be employed when no D.C. component is present in the data signal. In order to extend the bandwidth of such a system toward the low frequencies, the A.C. coupling must have a long time constant which also increases the time necessary to initially adjust the equalizer.

BRIEF DESCRIPTION OF THE INVENTION

It has been found that a received data signal may be rendered symmetrical with respect to an analog-to-digital slicing circuit by adding a D.C. level to the received data signal. The D.C. level should be proportional to the long-term average of the difference between the received signal and an ideal signal.

In one embodiment, the D.C. level is generated in response to the long-term average of a signal representing the polarity only of the above-mentioned difference.

A polarity deviation signal may be available in an automatic or adaptive equalizer. By adding an integrator to control the level of D.C. voltage source, a D.C. offset correction signal can be generated. Adding the D.C. offset correction signal to the other signal components making up the equalized output signal centers the equalized signal with respect to the slicing circuit aiding in proper equalization.

DESCRIPTION OF THE DRAWING

The figure is a block diagram of a signal equalization system embodying the principles of the invention in which the equalized signal is rendered symmetrical with respect to a slicing circuit.

DETAILED DESCRIPTION

The figure shows an adaptive transversal filter equalization system 10 of the type disclosed in the aforementioned patent application of R. W. Lucky, Ser. No. 460,794, modified to incorporate the principles of the present invention. A transversal filter 11 includes a center tap delay line 12 terminated in its characteristic impedance 13 for providing three identical signals displaced in time. One signal is available at an input terminal 14 of the delay line 12, a second signal at a center tap 16 of the delay line 12, and a third signal at an output terminal 17 of the delay line 12. It should be understood that a transversal filter utilizing any number of time displaced signals may be employed in the system of this invention. Three has been selected in this instance as an example for ease of explanation.

The input terminal 14 and the output terminal 17 of the delay line 12 are connected to first signal input terminals **18*a* and 18*b* of a pair of D.C. coupling analog multipliers 19*a* and 19*b*, respectively. Leads 21, 22, and 23 connect the multipliers 18*a* and 18*b* and the center tap 16 of the delay line 12, respectively, as inputs to a D.C. summing amplifier 24. When appropriate signals are applied to second input leads 26*a* and 26*b* of the analog multipliers 19*a* and 19*b*, respectively, an equalized signal appears on an output lead 27 of the summing amplifier 24**.

In accordance with common practice, a synchronous clock 28 phase locked to the data signal periodically enables a sampling gate 29 to provide time samples of the equalized signals. By way of example, a system for phase locking a sampling clock to a multilevel data signal is disclosed in a patent application of F. K. Becker-F. W. Lescinsky, Ser. No. 458,589, filed May 28, 1965, now abandoned, and entitled "Timing Phase Recovery System." A system for phase locking a sampling clock to a binary data signal is disclosed in a patent application of D. C. Weller, Ser. No. 631,521, filed Apr. 17, 1967, and entitled "System for Phase Locking Two Pulse Trains." The time samples of the equalized signal are sliced in an analog-to-digital slicing circuit 31. The slicing circuit 31 may be a Schmitt trigger circuit or a high gain differential amplifier having one of the differential inputs held at a reference slicing level. The slicing circuit 31 provides a digital output signal which is a digitalization, or normalization, of the equalized signal. The output signal has an amplitude equal to the data signal level next to the amplitude of the time samples of the equalized signal.

The sample of the equalized signal appearing at the output terminal of the sampling gate 29 is subtracted from the equalized output signal appearing at the output terminal of binary slicer 31 in subtractor 32 to provide a difference signal. The subtractor 32 may be a high gain differential amplifier so that if the signal from the sampling gate 29 exceeds from the slicing circuit 31, a first limit voltage appears at the output of the subtractor 32. If the signal from the slicing circuit 31 exceeds the signal from the sampling circuit 29 a second limit voltage is provided.

The difference signal from the subtractor 32 is delayed by a fixed delay element 33 a time interval equal to a multiple of the pulse repetition interval of the digital data signal. The equalized output signal is temporarily stored in a three-stage shift register 34 being advanced once each pulse repetition interval by clock 28.

The information stored in each stage of shift register 28 is sequentially multiplied by the delayed signal from the fixed delay element 33 in a pair of multipliers **36*a* and 36*b*. The multipliers 36*a* and 36*b* isolate the contribution to the intersymbol interference from each of the digital bits preceding and succeeding the bit present at at the center tap 16 of the delay line 12. This technique is theoretically justified in the aforementioned copending patent application of R. W. Lucky, Ser. No. 460,794. Since the information stored in the stages of the shift register 34 consists only of "1's" and "0's," multipliers 36*a* and 36*b* can be merely digital exclusive-OR circuits. The product signal from multipliers 36*a* and 36*b* are next applied to low pass filters 37*a* and 37*b* for providing time average product signals. A pair of slicers 38*a* and 38*b* are periodically enabled by counter 39 driven by the clock 28 to sample or slice the averaged product signals to determine the sign thereof. Slicers 38*a* and 38*b* are similar to binary slicer 31 except that a pulsed output is provided by slicers 38*a* and 38*b* while a D.C. output is provided by binary slicer 31. The output pulses from slicers 38*a* and 38*b* are applied to integrators 41*a* and 41*b*, the outputs of which are applied to inputs 26*a* and 26*b* of the analog multipliers 19*a* and 19*b*. The voltages applied to the inputs 26*a* and 26*b* of the multipliers 19*a* and 19*b*** are such as to cause the intersymbol interference to be reduced.

In a D.C. coupled time domain equalizer, as described, each circuit operating upon the received data signal introduces D.C. shifts. For example, with a received data signal applied to terminal 14 in which a logical "1" is represented by +1 volt and a logical "0" is represented by −1 volt, a signal may appear at the output of sampling gate 29 in which a logical "1" is represented by +.9 volt and a logical "0" is represented by −1.1 volts. The output of the slicing circuit 31 would still vary between +1 volt and −1 volt so that a steady state component would appear in the difference signal at the output of subtractor 32. The equalizer would attempt to compensate for this component of the difference signal by adjusting the analog multipliers **19*a* and 19*b*. The analog multipliers 19*a* and 19*b*, however, cannot control the average D.C. level of the signal at the output of sampling gate 29** so any adjustments caused by the steady state component of the difference signal will result in less than optimum equalization.

A second problem is caused by the D.C. offset. The signal presented by the sampling gate 29 to the slicing circuit 31, not being symmetrical with respect to the zero volt slicing level thereof, will tend to produce a higher error rate at the output of the slicing circuit.

It has been found that by applying the output of the subtractor 32 to an integrator 42 the steady state component of the difference signal is isolated. This isolated component is inverted in inverter 43 and applied to an input of an analog multiplier 44. A reference voltage source 46 is connected to the other input of the analog multiplier 44 providing a D.C. control signal at the output thereof. The D.C. control signal is applied as a fourth input to the D.C. summing amplifier 24 shifting the D.C. level of the signal at the output thereof to compensate for the D.C. offset.

It should be clear that the elimination of the D.C. offset improves the operation of the equalizer in two ways. First, the error rate at the output of the slicing circuit 31 is lowered by rendering the inuput thereto symmetrical with respect to the zero volt slicing level thereof. Second, the steady state component of the difference signal is removed preventing erroneous adjusting signals from being applied to the analog multipliers **19*a* and 19*b***.

It should be understood that the above-described arrangements are merely illustrative of the application of the principles of this invention. Numerous other arrangements may be devised by those skilled in the art without departing from the spirit and scope of this invention.

What is claimed is:

1. In combination:

a device having first and second input terminals and an output terminal, said device being responsive to first and second signals applied to said first and second input teminals respectively for providing an output signal proportional to a combination of said first and second signals;

a digitizing circuit responsive to said output signal for providing a digitized signal, said digitized signal assuming one of a predetermined number of states;

means responsive to said digitized signal and said output signal for providing a difference signal representing the difference between said digitized signal and said output signal; and means for integrating said difference signal for providing said second signal.

2. The combination as described in claim 1 in which said difference signal providing means provides a difference signal having one of two predetermined values;

one of said values indicating a positive difference while the other of said values indicates a negative difference.

3. The combination as described in claim 2 in which said predetermined states are discrete voltage levels, said second signal is a D.C. voltage level and said device provides said output signal proportional to the sum of said first and second signals.

4. The combination as defined in claim 3 in which said device is responsive at a third input terminal to a third signal to add said third signal to said output signal; said combination also including:

means responsive to a received signal for providing said first signal;

means for delaying said received signal for providing a delayed signal; and a multiplying circuit responsive to said delayed signal and a first adjusting signal for providing said third signal.

5. The combination as defined in claim 4 also including: means responsive to said difference signal and a second adjusting signal for providing said first adjusting signal.

6. The combination as defined in claim 5 in which said first adjusting signal providing means includes:

means for multiplying said digitized signal by a delayed replica of said difference signal to provide a product signal; and means for integrating said product signal for providing said first adjusting signal.

7. The combination as defined in claim 1 in which said integrating means includes:

an analog multiplier responsive to first and second drive signals for providing said second signal;

a reference voltage source for providing said first drive signal; and an integrator responsive to said difference signal for providing said second drive signal.

8. The combination as defined in claim 7 in which said second drive signal is inverted before being applied to said analog multiplier.

References Cited

UNITED STATES PATENTS 3,315,171 4/1967 Becker.

ELI LIEBERMAN, Primary Examiner

MARVIN NUSSBAUM, Assistant Examiner

U.S. Cl. X.R.

333—28